(12) United States Patent
Zhou et al.

(10) Patent No.: US 12,717,392 B2
(45) Date of Patent: Aug. 25, 2026

(54) POWER SUPPLY MANAGEMENT CIRCUIT

(71) Applicant: ROHM CO., LTD., Kyoto (JP)

(72) Inventors: Leijie Zhou, Kyoto (JP); Hirofumi Inada, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 139 days.

(21) Appl. No.: 18/897,465

(22) Filed: Sep. 26, 2024

(65) Prior Publication Data

US 2025/0013280 A1 Jan. 9, 2025

Related U.S. Application Data

(63) Continuation of application No. PCT/JP2023/011940, filed on Mar. 24, 2023.

(30) Foreign Application Priority Data

Mar. 30, 2022 (JP) ................................ 2022-056804

(51) Int. Cl.
*G06F 1/00* (2006.01)
*G06F 1/26* (2006.01)
*G06F 1/3203* (2019.01)

(52) U.S. Cl.
CPC .............. *G06F 1/26* (2013.01); *G06F 1/3203* (2013.01)

(58) Field of Classification Search
CPC .. G06F 1/26; G06F 12/02; G11C 5/14; G11C 16/34
USPC .......................................................... 713/300
See application file for complete search history.

(56) References Cited

U.S. PATENT DOCUMENTS

2008/0034234 A1* 2/2008 Shimizu ................ G06F 1/3275 713/320
2008/0043537 A1* 2/2008 Tanikawa ............ G06F 11/1004 365/185.23
2010/0110794 A1* 5/2010 Kim ....................... G11C 16/14 365/51
2011/0185108 A1* 7/2011 Yano .................... G11C 16/102 711/E12.008
2011/0219172 A1* 9/2011 Lin ......................... G06F 12/02 711/E12.001

(Continued)

FOREIGN PATENT DOCUMENTS

JP 2003076450 A 3/2003
JP 2009110150 A 5/2009
JP 2014206901 A 10/2014

OTHER PUBLICATIONS

International Search Report for International Application No. PCT/JP2023/011940; mailed May 9, 2023.

(Continued)

*Primary Examiner* — Volvick Derose
(74) *Attorney, Agent, or Firm* — CANTOR COLBURN LLP

(57) ABSTRACT

A PMIC controls multiple power supply circuits. Nonvolatile memory supports repeated writing and has multiple pages. A memory control circuit selects one from among the multiple pages of the nonvolatile memory and writes internal data that indicates an internal state of the power supply management circuit to the write target page. The memory control circuit selects an already-erased page as the write target page and writes the internal data to it, and erases pages other than the write target page.

10 Claims, 8 Drawing Sheets

(56) References Cited

U.S. PATENT DOCUMENTS

| | | | | |
|---|---|---|---|---|
| 2012/0230117 A1* | 9/2012 | Hama | G11C 16/08 | |
| | | | 365/185.29 | |
| 2013/0336067 A1* | 12/2013 | Tanaka | G06F 1/3225 | |
| | | | 365/185.18 | |
| 2015/0323969 A1* | 11/2015 | Hsu | G06F 1/266 | |
| | | | 713/310 | |
| 2016/0342355 A1* | 11/2016 | Teo | G06F 12/0246 | |
| 2017/0329381 A1* | 11/2017 | Chew | G06F 1/263 | |
| 2019/0377641 A1* | 12/2019 | Hong | G11C 16/10 | |
| 2020/0075108 A1* | 3/2020 | Rowley | G11C 16/30 | |
| 2022/0100244 A1* | 3/2022 | Sforzin | G06F 1/26 | |
| 2023/0317144 A1* | 10/2023 | Ha | G11C 7/1039 | |
| | | | 365/189.011 | |
| 2025/0087269 A1* | 3/2025 | Huang | G11C 16/0483 | |

OTHER PUBLICATIONS

PCT International Preliminary Report on Patentability with PCT Written Opinion of the International Search Authority for International Application No. PCT/JP2023/011940; mailed May 9, 2023.

* cited by examiner 500
200
510
202
I/F
260
NVM (MTP)
210
CONTROL LOGIC
212
SEQUENCER
214
MEMORY CONTROL CIRCUIT
DREF1
DREF2
DREFn
240_1
240_2
240_n
DAC
VREF1
VREF2
VREFn
250_1
250_2
250_n
POWER SUPPLY CIRCUIT
VOUT1
VOUT2
VOUTn
OUT1
OUT2
OUTn
502_1
502_2
502_n
CH1
CH2
CHn

| pg3 | pg4 | pg5 | pg6 | pg7 |
| --- | --- | --- | --- | --- |
| SS | SS | SS | SS | SS |

260

S202

| pg3 | pg4 | pg5 | pg6 | pg7 |
| --- | --- | --- | --- | --- |
| SS | SS | | SS | SS |

260

S204

| pg3 | pg4 | pg5 | pg6 | pg7 |
| --- | --- | --- | --- | --- |
| SS | SS | SS | SS | SS |

|  | pg3 | pg4 | pg5 | pg6 | pg7 |
|---|---|---|---|---|---|
|  | SS |  | SS | SS | SS |
|  | CRC VALUE |  | CRC VALUE | CRC VALUE | CRC VALUE |
| CRC | pass | fail | pass | pass | pass |

FIG. 8

| | pg3 | pg4 | pg5 | pg6 | pg7 |
|---|---|---|---|---|---|
| SS | $SS_{15}$ | $SS_{16}$ | $SS_{12}$ | $SS_{13}$ | $SS_{14}$ |
| CRC VALUE | $crc_{15}$ | $crc_{16}$ | $crc_{12}$ | $crc_{13}$ | $crc_{14}$ |
| ss_count | 15 | 16 | 12 | 13 | 14 |

POWER SUPPLY MANAGEMENT CIRCUIT

CROSS REFERENCE TO RELATED APPLICATIONS

This application is a continuation under 35 U.S.C. § 120 of PCT/JP2023/011940, filed Mar. 24, 2023, which is incorporated herein by reference, and which claimed priority to Japanese Application No. 2022-056804, filed Mar. 30, 2022. The present application likewise claims priority under 35 U.S.C. § 119 to Japanese Application No. 2022-056804, filed Mar. 30, 2022, the entire content of which is also incorporated herein by reference.

BACKGROUND

1. Technical Field

The present disclosure relates to a power supply management circuit that manages and controls multiple power supplies.

2. Description of the Related Art

Cellular phones, tablet terminals, laptop personal computers (PCs), desktop PCs, and game machines are each provided with a microprocessor such as a Central Processing Unit (CPU), a Graphics Processing Unit (CPU), or the like, configured to support calculation processing.

With the miniaturization of the semiconductor manufacturing process, the increase in the number of peripheral circuits to be mounted, and the demand for reduced power consumption, an electronic device configured to mount a microprocessor is divided into multiple circuit blocks, and is configured to allow the power supply voltage to be controlled independently for each circuit block In such devices, in order to control multiple power supply systems that correspond to the multiple circuit blocks, a Power Management Integrated Circuit (PMIC) is employed. A PMIC includes multiple channels of power supply circuits and nonvolatile memory.

In a case in which the nonvolatile memory is configured as repeatedly writable (MTP: multi-time programmable) nonvolatile memory, with an arrangement in which information with respect to errors that occur in an internal component of the PMIC is recorded as a log in the nonvolatile memory, this allows a malfunction that occurs in the PMIC to be analyzed.

The address space of the nonvolatile memory is divided into units called "pages", which can be written to in units of pages. With conventional techniques, when a data writing event occurs, the write target page is erased, following which data is written to this page. This leads to an increased period of time from the occurrence of a data writing event to the completion of data writing.

In a case of operating the nonvolatile memory using a residual charge stored in a backup capacitor if there is a loss of power, the time required for data writing is preferably as short as possible.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 is a diagram for explaining a single snapshot data write operation in the PMIC shown in FIG. 1, FIG. 4 is a diagram for explaining a snapshot data write operation according to a comparison technique, FIG. 7 is a diagram for explaining CRC detection of an already-erased page; and FIG. 8 is a diagram showing data stored in the nonvolatile memory.

DETAILED DESCRIPTION

Outline of Embodiments

Figure 1:
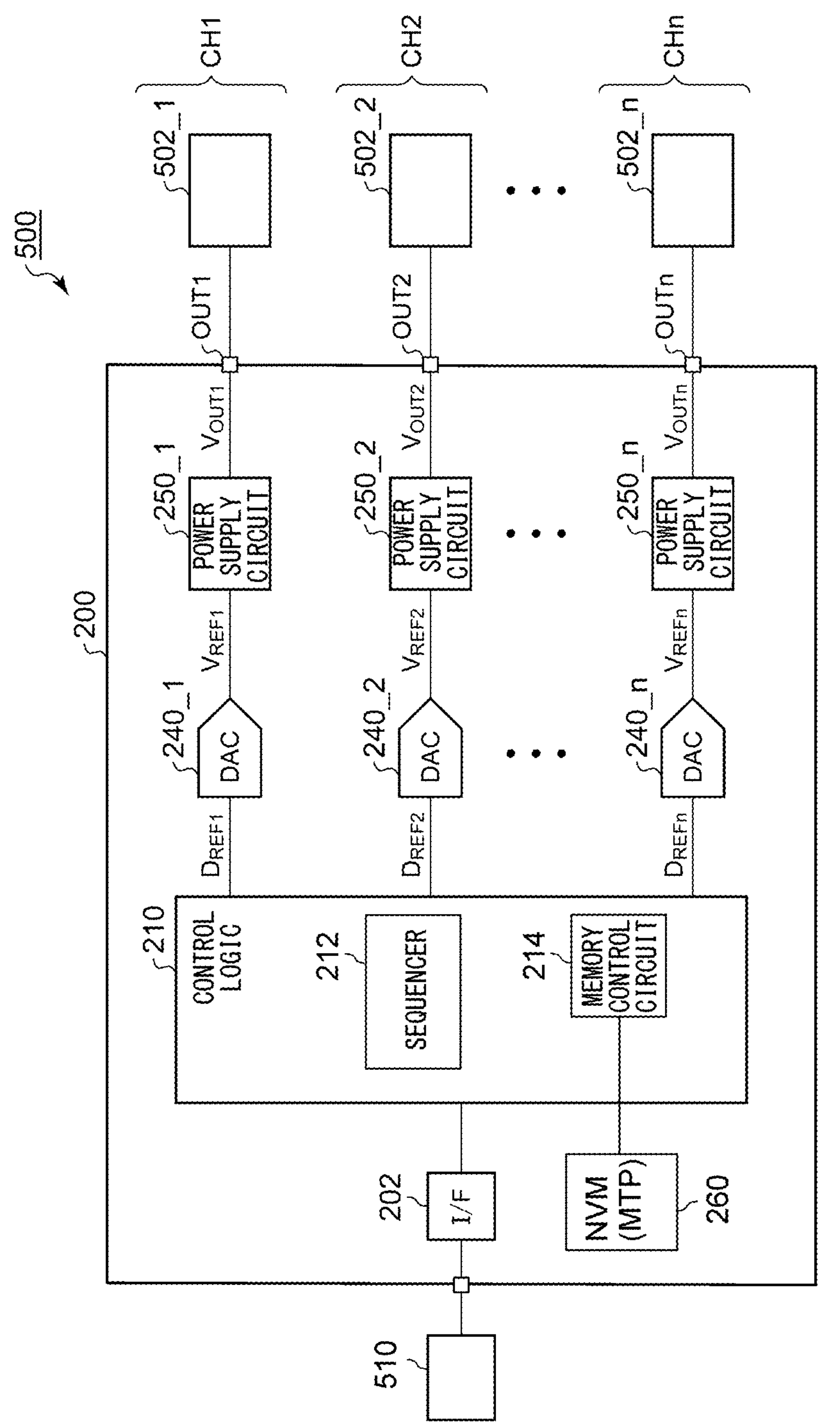
FIG. 1 is a block diagram of an electronic device provided with a power supply management integrated circuit according to an embodiment.

Description will be made regarding the outline of several exemplary embodiments of the present disclosure. The outline is a simplified explanation regarding several concepts of one or multiple embodiments as a preface to the detailed description described later in order to provide a basic understanding of the embodiments. That is to say, the outline described below is by no means intended to restrict the scope of the present invention and the present disclosure. The outline is by no means a comprehensive outline of all possible embodiments. That is to say, the outline is by no means intended to identify the indispensable or essential elements of all the embodiments and is by no means intended to define the scope of a part of or all the embodiments. For convenience, in some cases, an "embodiment" as used in the present specification represents a single or multiple embodiments (examples and modifications) disclosed in the present specification.

A power supply management circuit according to one embodiment controls multiple power supply circuits. The power supply management circuit includes repeatedly writable nonvolatile memory having multiple pages; and a memory control circuit structured to select one write target page from among the multiple pages of the nonvolatile memory, and to write internal data that indicates an internal state of the power supply management circuit to the write target page. The memory control circuit selects a page that has already been erased as the write target page and writes the internal data to the write target page. Furthermore, the memory control circuit erases all the pages except for the page selected as the current write target page.

With this configuration, immediately after internal data is written to a given page, another page is immediately erased so as to prepare for the next write operation. This allows internal data to be stored in the nonvolatile memory in a short period of time after a write event occurs.

In one embodiment, the memory control circuit may write the internal data to the multiple pages in a cyclic manner.

In one embodiment, when given data is to be written, the memory control circuit selects a page erased in a previous write step as a write target. Also, the memory control circuit may erase the next page following the page selected as the write target.

In one embodiment, the memory control circuit may judge whether or not each page has been erased based on data stored in the corresponding page.

In one embodiment, the memory control circuit may judge for each page that the page has been erased when an error is detected for the corresponding page by a cyclic redundancy check (CRC).

In one embodiment, in a startup operation of the power supply management circuit, the memory control circuit may judge whether or not all the pages have been erased.

In one embodiment, from among the already-erased pages, the memory control circuit may select a page having the smallest page number as a first write target.

In one embodiment, the memory control circuit may write a count value, which is incremented with each write operation, to each page together with data. Also, when no already-erased page is detected, the memory control circuit may select a page having a smaller count value as a first write target from two adjacent pages when they have discontinuous count values.

In one embodiment, the power supply management circuit may be integrated on a single semiconductor substrate. Examples of such an "integrated" arrangement include: an arrangement in which all the circuit components are formed on a semiconductor substrate; and an arrangement in which principal circuit components are monolithically integrated. Also, a part of resistors, capacitors, or the like, may be arranged in the form of components external to such a semiconductor substrate in order to adjust the circuit constants. By integrating the circuit on a single chip, such an arrangement allows the circuit area to be reduced and allows the circuit elements to have uniform characteristics.

Embodiments

Description will be made below regarding preferred embodiments with reference to the drawings. The same or similar components, members, and processes are denoted by the same reference numerals, and redundant description thereof will be omitted as appropriate. The embodiments have been described for exemplary purposes only and are by no means intended to restrict the present disclosure and the present invention. Also, it is not necessarily essential for the present disclosure and the present invention that all the features or a combination thereof be provided as described in the embodiments.

In the present specification, a state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, a state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

Embodiments

FIG. 1 is a block diagram of an electronic device 500 provided with a power supply management circuit (PMIC: Power Management IC) 200 according to an embodiment. The electronic device may be configured as a consumer device, in-vehicle device, or industrial device.

The PMIC 200 is mounted on the electronic device 500 including a plurality of n (n≥2) loads 502_1 through **502_*n*, and supplies suitable power supply voltages $V_{OUT1}$ through $V_{OUTn}$ to the multiple loads 502_1 through 502_*n*. The kind and the number of the loads 502 are not restricted in particular. Examples of the multiple loads 502_1 through 502_*n* include Central Processing Units (CPUs), Random Access Memory (RAM), Hard Disk Drives (HDDs), Solid State Drives (SSDs), audio circuits, display drives, etc. The unit of a component or function that corresponds to each load 502** will be referred to as a "channel CH". Here, n represents the number of channels.

For example, a part of or all the multiple loads 502_1 through **502_*n* may be configured as multiple blocks (CPU blocks, memory blocks) provided as internal components of a microcontroller. Also, the multiple loads 502_1 through 502_*n*** may be configured as separate devices.

In order for the electronic device 500 to operate normally, it is necessary to start up the multiple loads 502 in a predetermined order. Accordingly, this requires the on/off sequence for each component to be controlled with high precision on the order of several microseconds. For example, this requires the power supply for the RAM to be completed before a CPU accesses the RAM.

The PMIC 200 mainly includes an interface 202, a control logic 210, multiple D/A converters 240_1 through **240_*n*, multiple power supply circuits 250_1 through 250_*n*, and nonvolatile memory 260**, and is configured as a function IC having such components monolithically integrated on a single semiconductor substrate.

The multiple power supply circuits 250_1 through **250_*n* correspond to the multiple loads 502_1 through 502_*n*, respectively. The multiple power supply circuits 250_1 through 250_*n* are each configured to be independently on/off switchable. Each power supply circuit 250 may be configured as a boost, buck, or boost-buck DC/DC converter. Also, each power supply circuit 250 may be configured as a linear regulator such as Low Drop Output (LDO) or the like. Also, each power supply circuit 250 may be configured as a charge pump circuit or the like. It can be clearly understood by those skilled in this art that a part of the components that form the power supply circuit 250, e.g., an inductor, transformer, smoothing capacitor, feedback resistor, switching element, etc., may be configured as a chip component or discrete component externally provided to the IC of the PMIC 200**.

Each power supply circuit **250_*i* (i=1, 2, . . . , n) is configured to be capable of receiving an input of a reference voltage $V_{REFi}$. Each power supply circuit 250_*i*** stabilizes its output voltage $V_{OUTi}$ to the reference voltage $V_{REFi}$ received as an externally input voltage.

The control logic 210 integrally controls the PMIC 200. One of the main functions of the control logic 210 is as a sequencer 212. Upon detecting an event relating to a change of the operation mode of the electronic device 500, the sequencer 212 provided by the control logic 210 changes the states of the power supply circuits 250_1 through **250_*n*. Examples of the operation modes in this stage include a normal operation, stop operation, standby operation, shutdown operation, etc. The operation modes to be supported are designed according to the kind of the electronic device 500** or the like. In the present disclosure, the operation modes to be supported are not limited.

For example, upon detecting a startup event, the control logic 210 starts up the multiple power supply circuits 250_1 through **250_*n*** in a predetermined order and at predetermined time intervals.

Also, upon detecting a shutdown event, the control logic 210 shuts down the multiple power supply circuits 250_1 through **250_*n*** in a predetermined order and at predetermined time intervals.

Also, upon detecting a standby event, the control logic 210 switches some from among the multiple power supply circuits 250_1 through **250_*n* to a stopped state. Conversely, upon detecting a standby return event, the control logic 210 switches some from among the multiple power supply circuits 250_1 through 250_*n*** from the stopped state to the operation state.

The PMIC 200 generates digital control signals $D_{REF1}$ through $D_{REFn}$ that respectively define the output voltages $V_{OUT1}$ through $V_{OUTn}$ of the multiple power supply circuits 250_1 through **250_*n*. Each digital control signal $D_{REFi}$ is converted into an analog reference voltage $V_{REFi}$ by the corresponding D/A converter 240_*i*, and is supplied to the power supply circuit 250_*i***.

The PMIC 200 has a soft start function. That is to say, in the startup operation of the power supply circuit **250_*i*, the PMIC 200 gradually raises the output voltage $V_{OUTi}$. Furthermore, in the stop operation of the power supply circuit 250_*i*, the PMIC 200 gradually lowers the output voltage $V_{OUTi}$. During a soft start, the control logic 210** changes the digital control signal $D_{REFi}$ at a constant slope.

The PMIC 200 may have a Dynamic Voltage Scaling (DVS) function. In this case, the PMIC 200 is capable of individually changing the voltage level of the output voltage $V_{OUT}$ for each channel. The interface circuit 202 receives data DVS_DATA including the setting value of the output voltage $V_{OUTi}$ of each channel CHi from an external controller 510. Upon receiving the data DVS_DATA that is an instruction to change the setting value of the output voltage $V_{OUTi}$ of a given channel CHi, the PMIC 200 changes the output voltage $V_{OUTi}$ at a constant slope from the current setting value to the changed setting value.

The nonvolatile memory 260 is configured as multi-time programmable (MTP) memory. The nonvolatile memory 260 stores various kinds of data that define the operation of the sequencer 212. Furthermore, the nonvolatile memory 260 is configured to store multiple items of data that indicate the internal state of the PMIC 200 (which will be referred to as "snapshot data SS" hereafter). The snapshot data SS may be configured as a set of values to be stored in multiple registers provided to the nonvolatile memory 260. Upon detecting an event that functions as a trigger for storing the snapshot data SS (which will be referred to as a "snapshot trigger event" hereafter), the memory control circuit 214 instructs the nonvolatile memory 260 to store the snapshot data SS. The external controller 510 is capable of reading the snapshot data SS stored in the nonvolatile memory 260 via the interface circuit 202.

Figure 2:
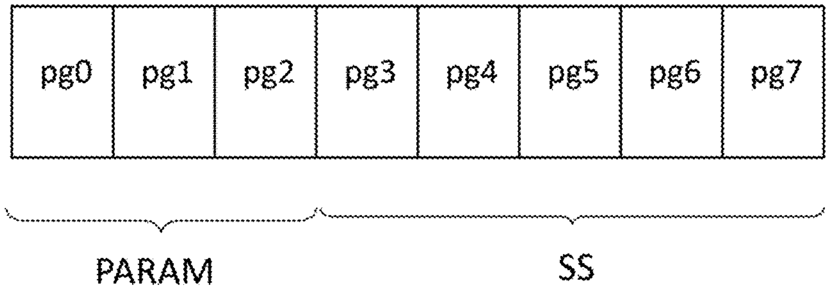
FIG. 2 is a diagram showing a configuration of nonvolatile memory.

FIG. 2 is a diagram showing a configuration of the nonvolatile memory 260. The address space of the nonvolatile memory 260 is divided into units called "pages". The nonvolatile memory 260 has multiple pages pg0 through pg7. Description will be made in the present embodiment regarding an example in which the number of pages is eight. Some of the multiple pages (pg0 to pg2) are assigned to parameters PARAM that define the operation of the sequencer. The remaining pages (pg3 through pg7) are assigned for storing the snapshot data SS.

Returning to FIG. 1, the control logic 210 includes the memory control circuit 214. The memory control circuit 214 selects one from among the multiple pages pg3 through pg7 of the nonvolatile memory 260 as a write target page and writes the snapshot data SS to the write target page.

The memory control circuit 214 selects a page that has already been erased as the write target page and writes the snapshot data SS to the write target page. Subsequently, after writing, the memory control circuit 214 erases all the pages except for the write target page selected in this stage.

In the present embodiment, the memory control circuit 214 writes the snapshot data SS to the multiple pages pg3 through pg7 in a cyclic manner. Specifically, after writing the snapshot data SS to a given page pgi (i=3 through 7) as a write target page, the memory control circuit 214 erases the next page pg (i+1). Subsequently, in the next snapshot data SS write operation, the page pg (i+1) is selected as a write target page. It should be noted that when i=7, i+1=3.

The above is the configuration of the PMIC 200. Next, description will be made regarding the snapshot data write operation of the PMIC 200.

Figure 3:
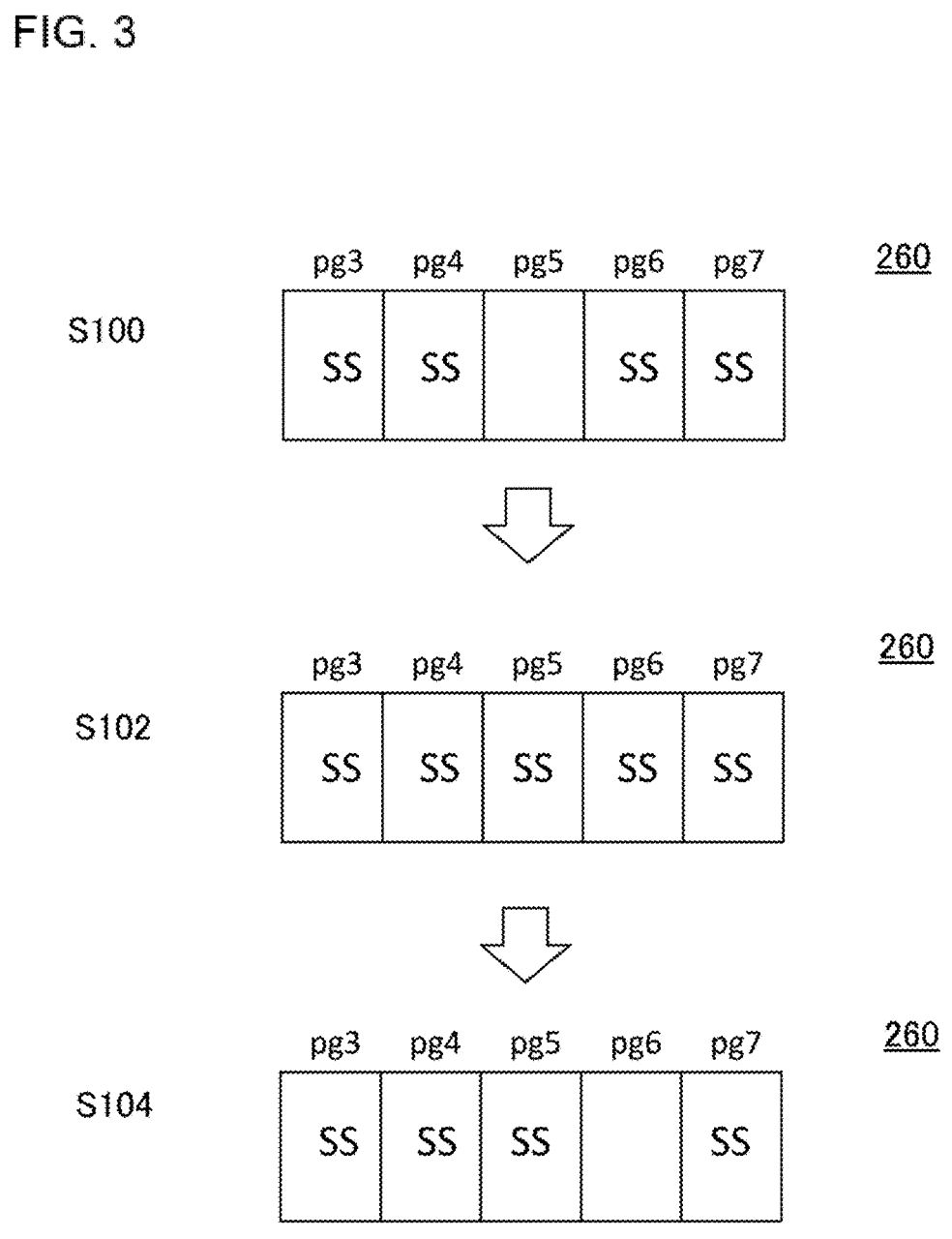

FIG. 3 is a diagram for explaining a single snapshot data write operation in the PMIC 200 shown in FIG. 1. FIG. 3 shows the multiple pages of the nonvolatile memory 260. Here, "SS" indicates a page storing snapshot data. On the other hand, a blank page represents an already-erased page.

In an initial state S100, the page pg5 is an already-erased page. The remaining pages pg3, pg4, pg6, and pg7 are pages to which snapshot data SS has been written.

In a write state S102 following the initial state S100, the memory control circuit 214 selects the already-erased page pg5 as a write target page and writes new snapshot data SS to the selected page pg5.

Subsequently, in an erase state S104 after the completion of writing, the memory control circuit 214 erases the next page pg6 after the page pg5 to which the immediately previous snapshot data SS was written.

The above is the operation of the PMIC 200. Next, description will be made regarding advantages of the PMIC 200. The advantage of the PMIC 200 can be clearly understood based on a comparison with a comparison technique. Accordingly, description will be made regarding such a comparison technique.

Figure 4:
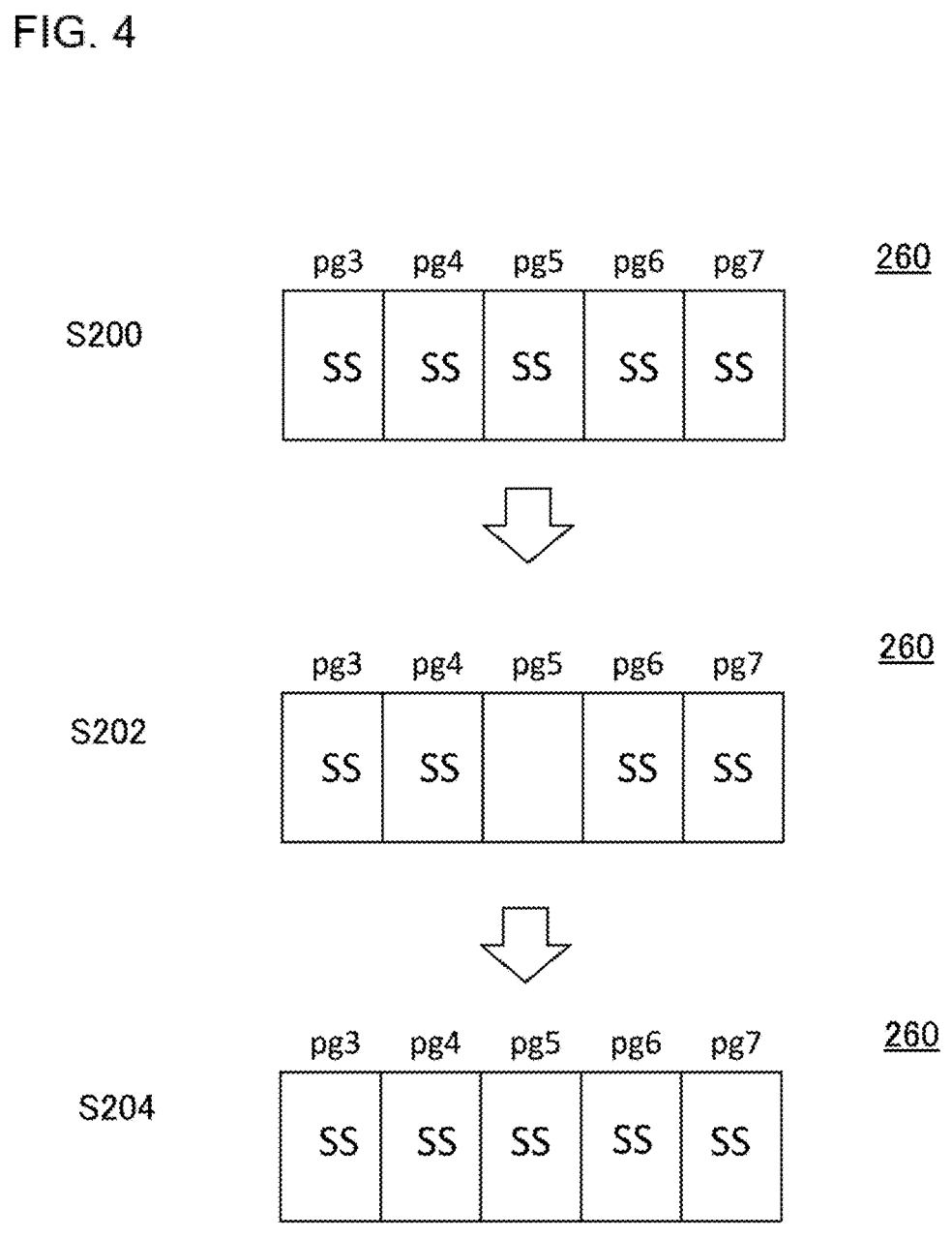

FIG. 4 is a diagram for explaining writing of snapshot data according to a comparison technique. In the comparison technique, in an initial state S200, all the pages pg3 through pg7 each store snapshot data.

In an erase state S202, the memory control circuit 214 erases the page pg5 to be selected as a write target. Subsequently, in the write state S204, the memory control circuit 214 writes the snapshot data SS to the page pg5 erased in the immediately previous state as a write target.

In the embodiment, one from among the five pages pg3 is in an erased state. Accordingly, with the embodiment, this allows four items of snapshot data SS to be stored. In contrast, with the comparison technique, all five pages pg3 through pg7 are each capable of storing snapshot data.

Figure 5:
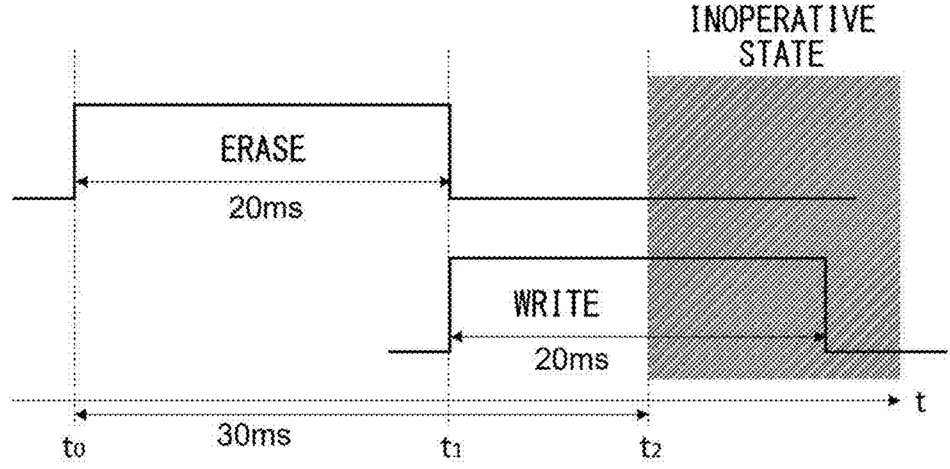
FIG. 5 is a diagram for explaining a snapshot data write operation in the PMIC according to a comparison technique.

FIG. 5 is a diagram for explaining a snapshot data write operation of the PMIC according to the comparison technique. Description will be made in this example assuming that 20 ms for erasing and 20 ms for writing are required. In addition, description will be made assuming that a snapshot trigger event occurs 30 ms before a time point at which the PMIC 200 becomes inoperative (at a time point to).

Description will be made regarding the comparison technique. When a snapshot trigger event occurs at the time point to, the write target page is erased. Subsequently, writing of the snapshot data SS is started at a time point $t_1$ after the erasing is completed. With this arrangement, the writing cannot be completed before the time point $t_2$ at which the PMIC 200 becomes inoperative.

Figure 6:
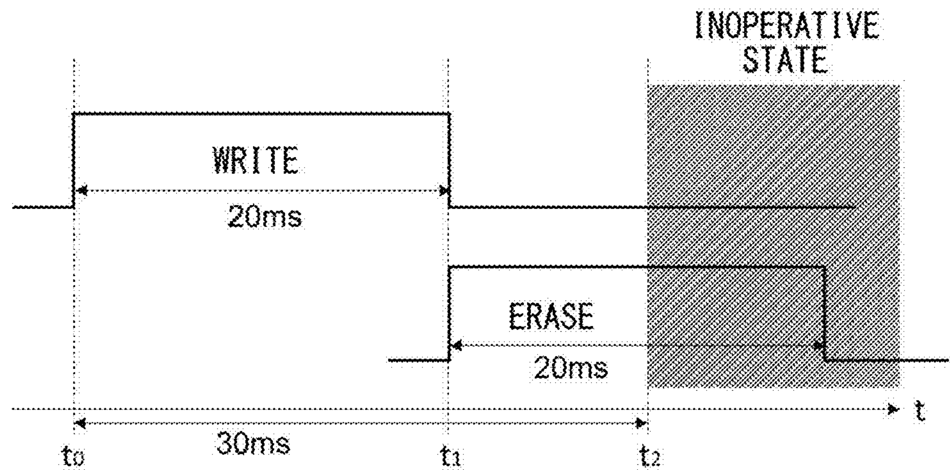
FIG. 6 is a diagram for explaining a snapshot data write operation in the PMIC according to an embodiment.

FIG. 6 is a diagram for explaining the snapshot data write operation of the PMIC 200 according to the embodiment. With the embodiment, the snapshot data SS can be written to the already-erased page immediately after the snapshot trigger event occurs at the time point $t_0$. Accordingly, this allows the writing to be completed before the time point $t_2$ at which the PMIC 200 becomes inoperative. It should be noted that, with such an arrangement, the erasing cannot be completed. Description will be made later regarding a countermeasure for this case.

As described above, with the PMIC 200 according to the embodiment, in a case in which a snapshot trigger event occurs, this is capable of storing the snapshot data SS in a sure manner.

Next, description will be made regarding detection of an already-erased page. With the embodiment, in order to determine a write target page pg, information with respect to which page has already been erased is required. To achieve this, a method is conceivable in which a value that represents an already-erased page is stored in an address space other than pages pg3 through pg7 to be used to store the snapshot data every time a given page is erased. This method can be effectively employed in an arrangement in which the nonvolatile memory 260 has a large capacity. However, in a case in which the nonvolatile memory 260 has a small capacity, it is difficult for such an arrangement to employ this method.

In one example, in the startup operation, the PMIC 200 read-accesses all the pages pg3 through pg7 so as to judge whether or not each page has already been erased based on the snapshot data SS stored in the corresponding page. With this, there is no need to store separate information of whether or not each page has been erased.

Whether or not each page has been erased can be judged using a cyclic redundancy check (CRC) value. When the snapshot data SS is written, the memory control circuit 214 writes the corresponding CRC value together with the snapshot data SS to a write target page.

In the startup operation of the PMIC 200, the memory control circuit 214 executes a CRC for each of the pages pg3 through pg7. When the writing of the snapshot data SS has been completed normally for a given page, no error is detected in the corresponding CRC. In contrast, a CRC error is detected for an already-erased page.

Figure 7:
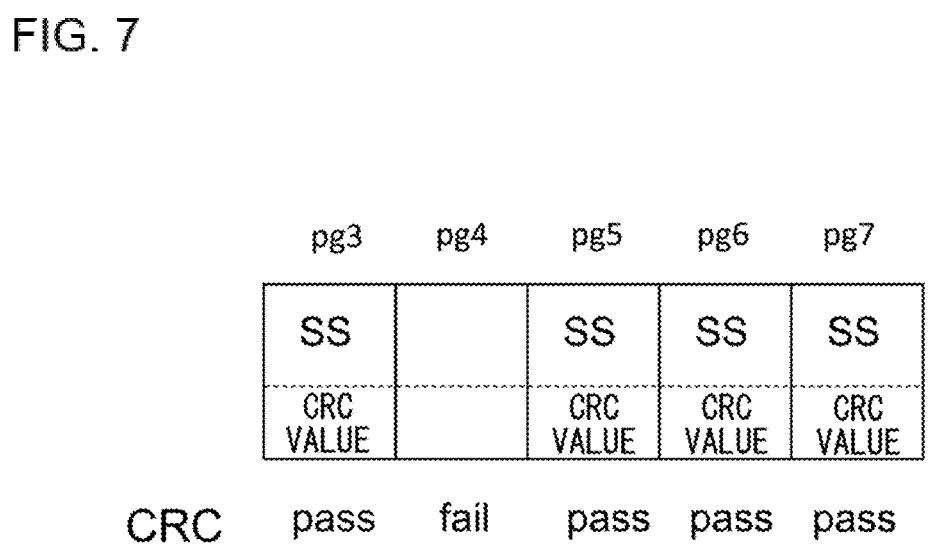

FIG. 7 is a diagram for explaining detection of an already-erased page by CRC. Description will be made in this example assuming that the page pg4 has already been erased, and the remaining pages each store the snapshot data SS and the CRC value.

When CRCs are executed for the multiple pages pg3 through pg7 in the startup operation of the PMIC 200, a pass judgment is made for a page to which snapshot data SS has been written. In contrast, a fail judgment is made for a page that has been erased. Accordingly, such an arrangement is capable of judging that the page pg4 has already been erased.

For example, the memory control circuit 214 holds a variable pg_ers that indicates a current already-erased page, i.e., a write target page. Upon detecting an already-erased page in the startup operation, the memory control circuit 214 stores a value that indicates the detected already-erased page. When a snapshot trigger event occurs, the memory control circuit 214 writes snapshot data SS to a page indicated by the variable pg_ers, and erases the page that corresponds to the value (pg_ers+1). Subsequently, after the erasing is completed, the memory control circuit 214 changes the value of the variable pg_ers to (pg_ers+1). That is to say, the memory control circuit 214 increments the variable pg_ers every time erasing is executed.

As described above with reference to FIG. 6, when a snapshot trigger event occurs immediately before the PMIC 200 becomes inoperative, writing of the snapshot data SS and the CRC value is completed. However, in some cases, the PMIC 200 shuts down before erasing of the next page is executed. In this case, in a case in which a CRC is executed for all the pages in the next startup operation of the PMIC 200, because there are no already-erased pages, such an arrangement has the potential for a pass judgment to be made for all the pages. In such a situation, the write target page can be determined using the following method.

The memory control circuit 214 holds a variable ss_count that indicates the number of times snapshot data SS has been stored. The variable ss_count is written to the write target page together with the snapshot data SS. After the writing of the snapshot data SS is completed, the variable ss_count is incremented.

FIG. 8 is a diagram showing data stored in the nonvolatile memory 260. Each page stores snapshot data SS, a CRC value, and a count value ss_count at the time of writing.

FIG. 8 shows a state in which there are no already-erased pages. In this case, as described above, the CRC results in a pass judgment for all the pages. In order to select the write target page, the count value ss_count is referenced for each page so as to detect a position at which the count value ss_count is discontinuous between two adjacent pages. It should be noted that the detection is made assuming that the pages pg7 and pg3 are adjacent pages.

In the example shown in FIG. 8, the count values ss_count of the pages pg4 and pg5 are discontinuous. Accordingly, from among the two pages, page pg5, which has the larger page number, is selected as the write target page. After determination of the write target page, the memory control circuit 214 erases the selected page, and stores a value that indicates its page number in the variable pg_ers. Furthermore, from among the count values ss_count stored in the multiple pages; a value obtained by adding 1 to the maximum value of the count values ss_count stored in the multiple pages (16 in this example) is determined as the initial value of the variable ss_count to be held by the memory control circuit 214.

It should be noted that, in this processing, the page with the smallest count value ss_count is selected as the write target page. Accordingly, instead of or in addition to detecting a discontinuity of page numbers, processing may be performed to detect the page storing the smallest count value ss_count.

With this processing, in a situation in which the PMIC 200 has stopped operating without completing the erasing, such an arrangement is capable of appropriately determining the write target page in the next startup operation of the PMIC 200.

MODIFICATIONS

The above-described embodiment has been described for exemplary purposes only. Rather, it can be readily conceived by those skilled in this art that various modifications may be made with respect to various combinations of the aforementioned components or processes. Description will be made below regarding such modifications.

Modification 1

Description has been made in the embodiment regarding an arrangement in which one page is used as the erase state. However, the present invention is not restricted to such an arrangement. Also, two or more pages may be used as the erase state. In this case, from among the already-erased pages, the page having the smallest page number may be selected as the first write target.

Modification 2

Description has been made in the embodiment regarding an arrangement in which the multiple pages pg3 through pg7 are used in a cyclic manner. However, the present invention is not restricted to such an arrangement. The write target page may be selected in a different order.

Modification 3

Description has been made in the embodiment regarding an arrangement in which the control logic 210 is integrated together with the power supply circuit 250. However, the present invention is not restricted to such an arrangement. Also, only a portion of the control logic 210 may be configured as an independent IC.

Description has been made regarding the present embodiments according to the present disclosure using specific terms. However, the above-described embodiments show only an example for ease of understanding. That is to say, the embodiments described above are by no means intended to restrict the technical scope of the present disclosure or claims. The technical scope of the present invention is defined in appended claims. Accordingly, embodiments, examples, and modifications that have not been described above are encompassed in the technical scope of the present invention.

Notes

The following techniques are disclosed in the present specification.

Item 1

A power supply management circuit structured to control a plurality of power supply circuits, comprising:

repeatedly writable nonvolatile memory having a plurality of pages; and a memory control circuit structured to select one write target page from among the plurality of pages of the nonvolatile memory, and to write internal data that indicates an internal state of the power supply management circuit to the write target page, wherein the memory control circuit selects a page that has already been erased as the write target page, and writes the internal data to the write target page, and wherein the memory control circuit erases all the pages except for the page selected as the current write target page.

Item 2

The power supply management circuit according to item 1, wherein the memory control circuit writes the internal data to the plurality of pages in a cyclic manner.

Item 3

The power supply management circuit according to item 2, wherein, when given data is to be written, the memory control circuit selects a page erased in a previous write step as a write target, and wherein the memory control circuit erases the next page following the page selected as the write target.

Item 4

The power supply management circuit according to any one of items 1 through 3, wherein the memory control circuit judges whether or not each page has been erased based on data stored in the corresponding page.

Item 5

The power supply management circuit according to item 4, wherein the memory control circuit judges for each page that the page has been erased when an error is detected for the corresponding page by a cyclic redundancy check (CRC).

Item 6

The power supply management circuit according to any one of items 1 through 3, wherein, in a startup operation of the power supply management circuit, the memory control circuit judges whether or not all the pages have been erased.

Item 7

The power supply management circuit according to item 6, wherein, from among the already-erased pages, the memory control circuit selects a page having the smallest page number as a first write target.

Item 8

The power supply management circuit according to item 6, wherein the memory control circuit writes a count value, which is incremented with each write operation, to each page together with data, and wherein, when no already-erased page is detected, the memory control circuit selects a page having a smaller count value as a first write target from two adjacent pages when they have discontinuous count values.

Item 9

The power supply management circuit according to any one of items 1 through 3, integrated on a single semiconductor substrate.

Item 10

An electronic device provided with the power supply management circuit according to any one of items 1 through 3.

What is claimed is:

1. A power supply management circuit structured to control a plurality of power supply circuits, comprising:

repeatedly writable nonvolatile memory having a plurality of pages; and a memory control circuit structured to select one write target page from among the plurality of pages of the nonvolatile memory, and to write internal data that indicates an internal state of the power supply management circuit to the write target page, wherein the memory control circuit is structured to select a page that has already been erased as the write target page, and to write the internal data to the write target page, and wherein the memory control circuit is structured to erase all the pages except for the page selected as the current write target page.

2. The power supply management circuit according to claim 1, wherein the memory control circuit is structured to write the internal data to the plurality of pages in a cyclic manner.

3. The power supply management circuit according to claim 2, wherein the memory control circuit is structured to select a page erased in a previous write step as a write target when given data is to be written, and wherein the memory control circuit is structured to erase the next page following the page selected as the write target.

4. The power supply management circuit according to claim 1, wherein the memory control circuit is structured to judge whether or not each page has been erased based on data stored in the corresponding page.

5. The power supply management circuit according to claim 4, wherein the memory control circuit is structured to judge for each page that the page has been erased when an error is detected for the corresponding page by a cyclic redundancy check (CRC).

6. The power supply management circuit according to claim 1, wherein the memory control circuit is structured to judge whether or not all the pages have been erased in a startup operation of the power supply management circuit.

7. The power supply management circuit according to claim 6, wherein the memory control circuit is structured to select a page having the smallest page number as a first write target from among the already-erased pages.

8. The power supply management circuit according to claim 6, wherein the memory control circuit is structured to write a count value, which is incremented with each write operation, to each page together with data, and wherein, when no already-erased page is detected, the memory control circuit selects a page having a smaller count value as a first write target from two adjacent pages when they have discontinuous count values.

9. The power supply management circuit according to claim 1, integrated on a single semiconductor substrate.

10. An electronic device provided with the power supply management circuit according to claim 1.

* * * * *